United States Patent [19]
Marshall

[11] 3,889,478
[45] June 17, 1975

[54] VEHICLE GUIDANCE
[75] Inventor: Leonard Marshall, Fleet, England
[73] Assignee: C.A.V. Limited, Birmingham, England
[22] Filed: Dec. 28, 1973
[21] Appl. No.: 431,324

[30] Foreign Application Priority Data
Dec. 29, 1972 United Kingdom............. 59997/72

[52] U.S. Cl. .................. 61/72.6; 180/98; 324/43; 340/258 C; 340/421
[51] Int. Cl. ..................... F16l 1/00; G08b 21/00
[58] Field of Search ......... 61/72.6, 72.1, 72.7, 72.5; 340/421, 258 C, 267, 256; 324/43, 67; 180/98

[56] References Cited
UNITED STATES PATENTS
2,428,360  10/1947  Dingley, Jr. .................. 324/43 X
3,235,024  2/1966  Barrett, Jr. .................... 180/98 X
3,407,895  10/1968  Hasenbalg ...................... 180/98 X
3,529,682  9/1970  Coyne et al. .................. 61/72.7 X
3,648,282  3/1972  Kelly ............................ 61/72.6 X Primary Examiner—Jacob Shapiro
Attorney, Agent, or Firm—Cushman, Darby & Cushman

[57] ABSTRACT

A guidance system for a wire laying vehicle having a plough for creating a furrow in which is buried a guidance conductor includes a sensing head disposed on a boom at the rear of the vehicle. The head senses the current flowing in the conductor which has been alid and controls the steered wheels of the vehicle to maintain the vehicle on the desired course.

15 Claims, 6 Drawing Figures 3,889,478

VEHICLE GUIDANCE

This invention relates to vehicle guidance system of the kind in which guidance of the vehicle is effected by means of electrical signals which are generated in windings disposed in a sensing head carried by the vehicle, by means of an electrical current flowing in a guidance conductor which is laid along the path of movement required of the vehicle.

The electrical signals are utilized to control the steering mechanism of the vehicle so that the vehicle follows the path taken by the conductor. Such a system is particularly useful in the agricultural field and in such an application the conductor is usually buried. The accuracy with which the vehicle will carry out the required programme of operations will depend upon the accuracy of the wire laying operation and it is therefore important that this operation should itself be carried out with great care.

In theory it is not difficult for the driver of a wire laying vehicle to follow a path between two set marks. In practice, however, his attention is liable to wander particularly when working over long distances for extended periods of time and where ground conditions may not be ideal for the wire laying operation.

The object of the invention is to provide a method and apparatus for laying the guidance conductor.

According to the invention a method of laying a guidance conductor comprises first laying a short length of conductor to a high degree of accuracy, passing an electric current through the conductor, laying the remaining lenght of conductor using a wire laying vehicle and guiding the path followed by the wire laying vehicle using a guidance system including a sensing head on the vehicle and disposed to provide guidance signals generated by the current flowing in said short length of the conductor and in the conductor subsequently laid by the wire laying vehicle.

According to a further feature of the invention the method comprises altering the parameters of the guidance system so that the wire laying vehicle can be caused to follow a curve.

According to a further feature of the invention the alteration of the parameter is achieved by moving the sensing head relative to the vehicle.

According to a further feature of the invention the alteration of the parameter is achieved by altering a reference voltage within the guidance system.

An apparatus in accordance with the invention comprises a wire laying vehicle including a steering mechanism, a sensing head mounted behind the wire laying vehicle, the sensing head forming part of a guidance system to control the path followed by the vehicle, the sensing head picking up signals from a guidance conductor which is being layed in the ground by the vehicle, the initial portion of said conductor being laid to a high degree of accuracy.

According to a further feature of the invention the vehicle includes means for passing an electric current through the conductor.

According to a further feature of the invention the sensing head is movable laterally whereby the vehicle can be caused to follow a curved path. According to the further feature of the invention the guidance system includes means for altering a reference voltage within the system whereby the vehicle can be caused to follow a curved path. The invention will now be more particularly described with reference to the accompanying drawings, in which.

Figure 1:
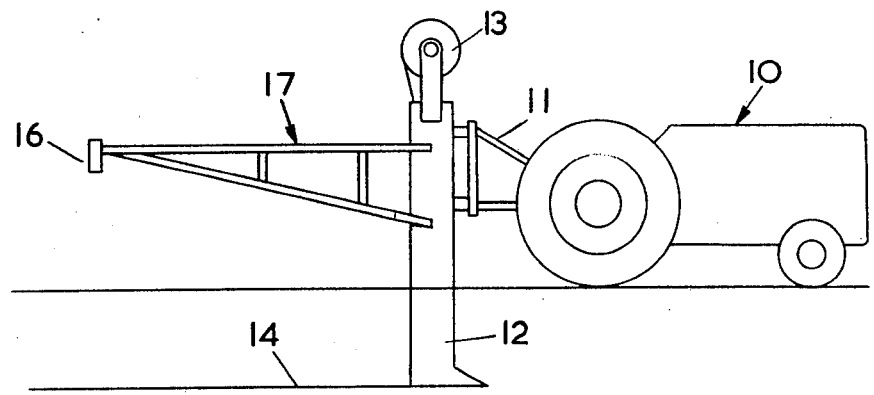
FIG. 1 is a side elevation of a vehicle adapted to lay a guidance conductor.
Figure 2:
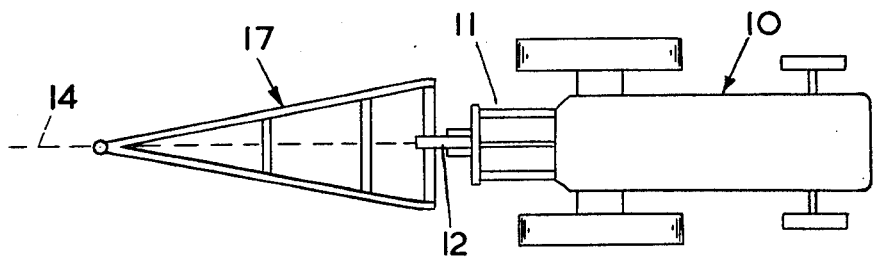
FIG. 2 is a plan view of the vehicle shown in FIG. 1.
Figure 3:
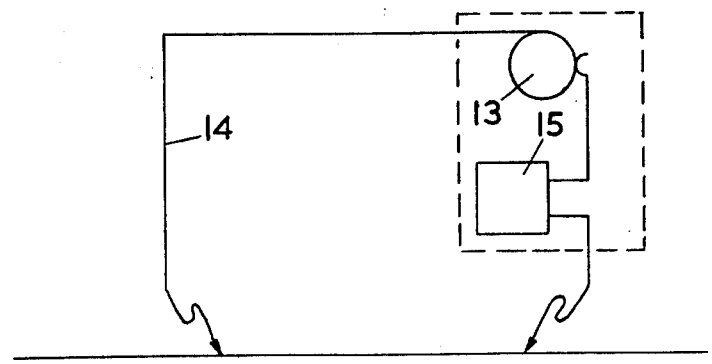
Figure 4:
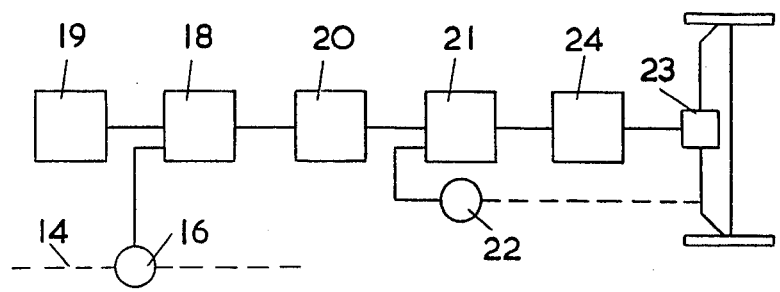
Figure 5:
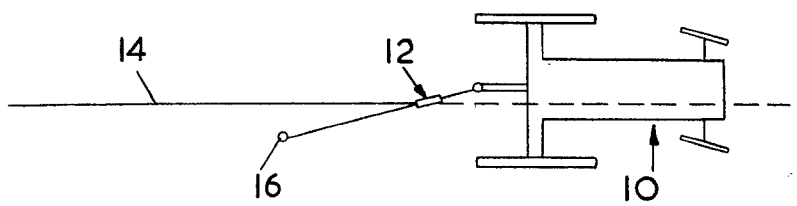
Figure 6:
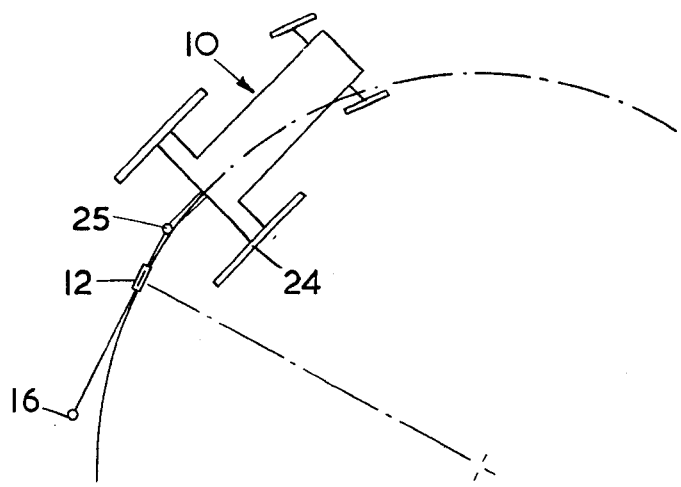

FIG. 3 is an electrical circuit diagram showing the way in which the guidance conductor is supplied with electric current, FIG. 4 is a block diagram showing the guidance system of the vehicle, and FIGS. 5 and 6 illustrate the operation of the vehicle whilst laying the conductor in straight and curved lines respectively. With reference to FIGS. 1 and 2 of the drawings, the wire laying vehicle is shown as an agricultural tractor 10 to which is secured by means of adjustable linkage 11, a mole plough 12. The linkage 11 enables the positioning of the plough to be adjusted so as to enable the depth of the furrow to be adjusted and it also permits pivotal movement of the plough.

Mounted on the plough is a drum 13 upon which is wound the conductor to be laid. The conductor is insulated and is fed into the trench created by the plough by a suitable guide not shown, mounted on the plough. FIG. 1 shows a length 14 of conductor laid by the vehicle it being appreciated that the conductor is laid behind the vehicle as it moves in the forward direction.

As shown in FIG. 3, means is provided for passing an alternating electric current through the conductor and this comprises an electric generator 15 one terminal of which is connected to the end of the conductor wound on the drum 13 conveniently by means of a slip ring arrangement, and the other terminal of which is connected to earth through the body of the mole plough 12. The other end of the conductor is earthed through a suitable plate not shown. When the generator is in operation an electric current flows in the conductor and this generates an alternating magnetic field which can be detected using a sensing head 16.

The sensing head 16 is mounted upon the plough on a boom 17 extending rearwardly of the tractor vehicle and at a height above ground level so that contact with the ground is avoided whilst at the same time providing an adequate signal strength. Moreover, a gimbal mechanism may be provided to ensure that the head is vertically disposed at all times.

With reference now to FIG. 4; the sensing head is indicated at 16 and is disposed above the guidance conductor 14. The head includes or there is provided an electrical discriminator the output signal from which is a DC voltage the level and polarity of which varies as the head moves laterally relative to the guidance conductor. The DC voltage is applied to one input of a comparator 18 which compares the signal from the head with a reference signal provided by a generator 19. The reference signal is also a DC signal and any difference between the two signals appears at the output of the comparator as a guidance signal which is amplified in an amplifier 20 before being supplied to a further comparator 21. The guidance signal is compared with the output of a transducer 22 which senses the angle of the steered wheels of the vehicle. The output of the comparator 21 is applied to a wheel positioning servo unit 23 by way of a further amplifier 24.

In use, as long as the sensing head remains above the guidance conductor the vehicle will move in a straight line providing the reference voltage provided by the generator is zero. If for some reason the sensing head moves away from the conductor then the system effects movement of the steered wheels of the vehicle to bring the head back into position over the conductor. It will be understood that in the case described the sensing head and the conductor layed are aligned with the axis of movement of the vehicle. If the plough is positioned to one side of the vehicle then the sensing head must also be displaced to the side of the vehicle. Alternatively if the head remains aligned with the axis of movement of the vehicle the reference signal may be adjusted to compensate for the offset signal provided by the head.

FIG. 5 demonstrates to an enlarged scale the mode of operation when laying the guidance conductor in a straight line. An initial portion of the conductor is laid using an accurate method for instance by driving the vehicle under manual control utilizing sighting posts. If this method is used it is assumed that the sensing head 16 will be positioned directly over the wire which has been layed and when the vehicle is switched to automatic control it will use the accurately layed portion of the conductor for guidance purposes followed by the length of conductor layed by the vehicle when under automatic control. A situation may arise where the vehicle is displaced laterally as illustrated in FIG. 5 and when this occurs the boom swings with the plough acting as a pivot. As a result the head 16 is laterally displaced and an error signal is generated which causes movement of the steered wheels of the vehicle to correct the lateral displacement. As the vehicle moves toward its correct position the steered wheels of the vehicle are gradually straightened.

The system can also be utilized to lay the guidance conductor on a curved path and this mode of operation will now be described with reference to FIG. 6. The system adopted is to adjust the reference voltage provided by the reference generator 19. As has been stated the comparator 18 compares the signals produced by the sensing head 16 and the generator 19. If the two signals are zero or equal and the head lies on the axis of movement of the vehicle no steering correction is effected and the tractor moves in a straight line. If the reference voltage is altered then the guidance system will effect movement of the steered wheels to reduce the error between the signals and the effect of this is to cause the vehicle to follow a curve.

If the reference voltage is maintained constant then the vehicle will follow a curve of constant radius, the minimum radius being determined by the turning circle of the vehicle. Moreover, any change in the curvature of the path followed by the vehicle will be corrected in the manner described for straight line operation.

The response of the vehicle to steering corrections will clearly depend upon the response of the electrical guidance system and in particular the response of the vehicle to movement of the steered wheels. The relative positions of the rear wheels 24 of the vehicle, the pivot point 25, the mole plough 12 and the sensing head 16, are also important so far as the sensitivity of the system to errors is concerned.

Movement of the vehicle on the curved path can also be obtained by displacing the sensing head laterally on the boom. The effect of such movement is that the guidance system will cause the vehicle to steer around a curve so that the sensing is maintained vertically over the conductor, the vehicle having a lateral deviation from the conductor.

The sensing head may be used to sense the depth of the wire and to effect adjustment.

I claim:

1. A method of laying a guidance conductor of the kind intended to be used in a vehicle guidance system comprises first laying a short length of conductor to a high degree of accuracy, passing an electric current through the conductor, laying the remaining length of conductor using a wire laying vehicle and guiding the path followed by the wire laying vehicle using a guidance system including a sensing head on the vehicle and disposed to provide guidance signals generated by the current flowing in said short length of conductor and in the conductor subsequently laid by the wire laying vehicle.

2. A method according to claim 1 including the additional step of altering the parameters of the guidance system so that the wire laying vehicle can be caused to follow a curve.

3. A method as claimed in claim 2 in which the alteration of the parameter is achieved by moving the sensing head relative to the vehicle.

4. A method as claimed in claim 2 in which the alteration of the parameter is achieved by altering a reference voltage within the guidance system.

5. Apparatus for laying a guidance conductor of the kind intended to be used in a vehicle guidancce system and comprising a wire laying vehicle including a steering mechanism, a sensing head mounted behind the wire laying vehicle, the sensing head forming part of a guidance system to control the path followed by the vehicle, the sensing head picking up signals from a guidance conductor which is being layed in the ground of the vehicle, the initial portion of said conductor being laid to a high degree of accuracy.

6. An apparatus as claimed in claim 5 in which the vehicle includes means for passing an electric current through the conductor.

7. An apparatus as claimed in claim 6 in which the sensing head is movable laterally whereby the vehicle can be caused to follow a curved path.

8. An apparatus as claimed in claim 6 in which the guidance system includes means for altering a reference voltage within the system whereby the vehicle can be caused to follow a curved path.

9. An apparatus as claimed in claim 8 including a mole plough mounted at the rear of the vehicle on a linkage which permits pivotal movement of the plough about an axis normal to the ground, the sensing head being mounted upon a boom secured to the plough and extending rearwardly of the vehicle.

10. An apparatus for laying a guidance conductor of the kind intended to be used in a vehicle guidance system comprising a wire laying vehicle including a steering mechanism, a mole plough, linkage means mounting the plough at the rear of the vehicle, said linkage means allowing pivotal movement of the plough about an axis normal to the ground, a boom secured to the plough and extending rearwardly of the vehicle, a sensing head mounted on said boom, a guidance system for controlling the path followed by the vehicle, said sensing head forming part of said guidance system, means on the vehicle for laying a guidance conductor in a furrow created by the plough as the vehicle is driven forwardly, means for passing an electric current through the conductor said means comprising an AC generator mounted on the vehicle and having one terminal connected to the plough blade and its other terminal connected to the end of the guidance conductor on the vehicle, the other end of the guidance conductor in use, being earthed so as to complete the electrical circuit for the generator, said sensing head picking up signals from the guidance conductor which is being laid in the ground by the vehicle, the initial portion of said conductor being laid to a high degree of accuracy.

11. An apparatus as claimed in claim 10 in which the guidance conductor is carried on a drum and a slip ring and co-operating brush is provided to effect connection of said other terminal of the generator to the guidance conductor.

12. An apparatus as claimed in claim 8 in which the guidance system includes a comparator, a reference generator for providing a DC reference signal which is applied to one input terminal of the comparator the other input terminal of the comparator being supplied with a DC signal derived from the sensing head and which varies at least in amplitude depending upon the lateral position of the sensing head relative to the guidance conductor, the output signal from the comparator being utilized to control the position of the steered wheels of the vehicle.

13. An apparatus as claimed in claim 12 in which the signal from the first comparator is applied through an amplifier to one input terminal of a further comparator the other input terminal of which is supplied with a signal derived from a position transducer which senses the actual position of the steered wheels of the vehicle, the output of said second comparator controlling the position of the steered wheels.

14. An apparatus as claimed in claim 10 in which the sensing head is movable laterally on the boom whereby the vehicle can be caused to follow a curved path.

15. An apparatus as claimed in claim 10 in which the guidance system includes means for adjusting a reference voltage within the system whereby the vehicle can be caused to follow a curved path.

* * * * *